United States Patent
Golitschek et al.

(10) Patent No.: US 7,111,219 B2
(45) Date of Patent: *Sep. 19, 2006

(54) DATA TRANSMISSION APPARATUS USING A CONSTELLATION REARRANGEMENT

(75) Inventors: Alexander Golitschek, Langen (DE); Christian Wengerter, Langen (DE); Michael Philipp Schmitt, Langen (DE); Eiko Seidel, Langen (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/003,405

(22) Filed: Dec. 6, 2004

(65) Prior Publication Data
US 2005/0097424 A1    May 5, 2005

Related U.S. Application Data

(63) Continuation of application No. 10/239,794, filed on Nov. 29, 2002, now Pat. No. 6,892,341.

(51) Int. Cl.
*G08C 25/02* (2006.01)
*H04L 1/18* (2006.01)

(52) U.S. Cl. ........................ 714/748; 370/465
(58) Field of Classification Search ............... 714/748; 370/465
See application file for complete search history.

(56) References Cited

U.S. PATENT DOCUMENTS

| | | | |
|---|---|---|---|
| 4,344,171 A | 8/1982 | Lin et al. | |
| 4,495,619 A | 1/1985 | Acampora | |
| 4,523,323 A | 6/1985 | Nakajima et al. | |
| 5,134,694 A | 7/1992 | Jousselin et al. | |
| 5,428,643 A | 6/1995 | Razzell | |
| 5,524,025 A | 6/1996 | Lawrence et al. | |
| 5,831,561 A | 11/1998 | Cai et al. | |
| 5,914,959 A * | 6/1999 | Marchetto et al. | 370/468 |
| 5,953,376 A | 9/1999 | Wei | |
| 6,126,310 A | 10/2000 | Osthoff et al. | |

(Continued)

FOREIGN PATENT DOCUMENTS

CN     1411236     4/2003

(Continued)

OTHER PUBLICATIONS

M. Isaka, et al., "On the design of bit-interleaved coded modulation with Turbo codes", Institute of Industrial Science, The University of Tokyo, 1999, p. 311.

(Continued)

*Primary Examiner*—Joseph D. Torres
(74) *Attorney, Agent, or Firm*—Stevens, Davis, Miller & Mosher, LLP

(57) ABSTRACT

A hybrid ARQ retransmission method involves encoding data packets with a forward error correction (FEC) technique prior to transmission. The data packets are retransmitted based on an automatic repeat request (ARQ) and subsequently soft-combined with previously received erroneous data packets either on a symbol-by-symbol or a bit-by-bit basis. The symbols of the erroneous data packets are modulated by employing a first signal constellation. The symbols of the re-transmitted data packets are modulated by employing at least a second signal constellation. Each symbol bit has a mean bit reliability defined by the individual bit reliabilities over all symbols of the predetermined signal constellation. The first constellation and the at least second signal constellation are selected such that the combined mean bit reliabilities for the respective bits of all transmissions are averaged out.

10 Claims, 9 Drawing Sheets

U.S. PATENT DOCUMENTS

| | | | |
|---|---|---|---|
| 6,134,694 | A | 10/2000 | Uebayashi et al. |
| 6,138,260 | A | 10/2000 | Ketseoglou |
| 6,233,254 | B1 | 5/2001 | Myers |
| 6,247,150 | B1 | 6/2001 | Niemela |
| 6,463,106 | B1 | 10/2002 | Prasanna |
| 6,473,878 | B1 | 10/2002 | Wei |
| 6,476,734 | B1 | 11/2002 | Jeong et al. |
| 6,567,475 | B1 | 5/2003 | Dent et al. |
| 6,584,190 | B1 | 6/2003 | Bressler |
| 6,606,355 | B1 | 8/2003 | Wei |
| 6,625,165 | B1 * | 9/2003 | Krishnamoorthy et al. . 370/465 |
| 6,647,069 | B1 | 11/2003 | Segal et al. |
| 6,769,085 | B1 | 7/2004 | Von Elbwart et al. |
| 6,798,846 | B1 | 9/2004 | Golitschek Edler Von Elbwart et al. |
| 6,892,341 | B1 * | 5/2005 | Golitschek et al. ......... 714/748 |
| 2005/0097424 | A1 | 5/2005 | Golitschek et al. |

FOREIGN PATENT DOCUMENTS

| | | |
|---|---|---|
| DE | 19705354 | 8/1998 |
| EP | 0938207 | 8/1999 |
| EP | 1043858 A1 | 10/2000 |
| EP | 1447935 | 8/2004 |
| JP | 64055942 | 3/1989 |
| JP | 02312338 | 12/1990 |
| JP | 03274933 | 12/1991 |
| JP | 06006399 | 1/1994 |
| JP | 6252971 | 9/1994 |
| JP | 738448 | 2/1995 |
| JP | 07143185 | 6/1995 |
| JP | 879325 | 3/1996 |
| JP | 08065279 | 3/1996 |
| JP | 09307517 | 11/1997 |
| JP | 11177648 | 7/1999 |
| JP | 2000188609 | 7/2000 |
| JP | 2000201132 | 7/2000 |
| WO | 9959269 | 11/1999 |
| WO | 03019794 | 3/2003 |

OTHER PUBLICATIONS

M. P. Schmitt, "Hybrid ARQ Scheme Employing TCM and Packet Combining", Electronics Letters, vol. 34, No. 18, Sep. 3, 1998, pp. 1725-1726.

K. Narayanan, et al., "A Novel ARQ Technique using the Turbo Coding Principle", IEEE Communications Letter, IEEE Service Center, vol. 1, No. 2, Mar. 1, 1997, pp. 49-51, XP000687091.

C. Berrou, et al.; "Near Shannon Limit Error-Correcting Coding and Decoding:Turbo-Codes(1)", IEEE 1993, pp. 1064-1070.

S. Le Goff et al.; "Turbo-Codes and High Spectral Efficiency Modulation", Telecom Bretagne, France Telecom University, IEEE 1994, pp. 645-649.

A. Burr; Modulation and Coding for Wireless Communications, Pearson Education, Prentice Hall, pp. 133-315.

"Enhanced HARQ Method with Signal Constellation Rearrangement" TSG-RAN Working Group 1 Meeting #19, Las Vegas, USA, Feb. 27-Mar. 2, 2001, Panasonic, AH24 (HSDPA), XP-02229383 pp. 1-11.

6.8 Hybrid ARQ (H-ARQ with Full IR (H-ARQ-Type-II) 3G TR25.848 V0.6.0 (May 2000), TSG-RAN Working Group 1 meeting #19 Las Vegas, USA, Feb. 27-Mar. 2, 2001, pp. 30-45.

S. Lin, et al.; "A Hybrid ARQ Scheme with Parity Retransmission for Error Control of Satellite Channels," IEEE Transactions on Communications, vol. com-30, No. 7, Jul. 1982, pp. 1701-1719.

Japanese Office Action dated Oct. 14, 2003 with English Translation related to Application No. 10/182,569.

US Office Action dated Jan. 12, 2004 in Application No. 10/295,899.

US Office Action dated Dec. 8, 2003 in Application No. 10/298,207.

International Search Report dated Jan. 29, 2002.

European Search Report dated May 31, 2002 related to Application No. 10/295,899.

European Search Report dated May 31, 2002 related to Application No. 10/298/207.

Copy of Application No. 10/182,569.

Copy of Application No. 10/295,899.

Copy of Application No. 10/298,207.

S. Kallel; "Analysis of a Type II Hybrid ARQ Scheme with Code Combining", IEEE Transactions on Communications, vol. 38, No. 8, Aug. 1999, pp. 1133-1137.

S. Kallel, et al.; "Throughput Performance of Memory ARQ Schemes", IEEE Transactions on Vehicular Technology, vol. 48, No. 3, May 1999, pp. 891-899.

D. Chase; "Code Combining-A Maximum-Likelihood Decoding Approach for Combining an Arbitrary Number of Noisy Packets", IEEE Transactions of Communications, vol. comm.-33, No. 5, May 1985, pp. 385-393.

B. A. Harvey, et al.; "Packet Combininb Systems Based on the Viterbi Decoder", IEEE Transactions on Communications, vol. 42, No. 2/3/4, Feb./Mar./Apr. 1994, pp. 1544-1557.

M. P. Schmitt; "Improved Retransmission Strategy for Hybrid ARQ Schemes Employing TCM", IEEE 1999, pp. 1226-1228.

International Search Report dated Oct. 16, 2001.

Schmitt, M.P.: Hybrid ARQ scheme employing TCM and packet combining, Electronics Letters, vol. 34, Issue: 18, Sep. 3, 1998 pp. 1725-1726.

European Search Report dated Oct. 14, 2004.

Indian Office Action dated Nov. 3, 2004.

Korean Office Action dated Jan. 15, 2005.

M. Morimoto, et al.; "A Hierarchical Image Transmission System for Multimedia Mobile Communications," First International Workshop on Wireless Image/Video Communications, IEEE COMSOC, EURASIP, Department of Communications Engineering, Faculty of Engineering, Osaka University, Osaka, Japan, pp. 80-84, Sep. 1996.

M. Morimoto, et al.; "A Hierarchical Image Transmission System in a Fading Channel," Department of Electral Engineering, Faculty of Engineering, Osaka, Japan, IEEE, pp. 769-772, Nov. 1995.

European Office Action dated Sep. 5, 2005.

European Search Report dated Sep. 6, 2005.

Office Action dated Aug. 30, 2005 in 10/853,266.

Office Action dated Aug. 22, 2005 in 11/003,437.

Office Action dated Feb. 14, 2006 in 11/003,437.

Chinese Office Action dated Jan. 20, 2006 with English translation.

Chinese Office Action dated Feb. 10, 2006 with English translation.

"ARQ Error Control Techniques," TSG-RAN Working Group 2 (Radio layer and Radio layer3), TSGR2#2(99)085, Stockholm, pp. 1-5, Mar. 8-11, 1999.

* cited by examiner

Constellation 4

Constellation 3

DATA TRANSMISSION APPARATUS USING A CONSTELLATION REARRANGEMENT

This is a continuation of application Ser. No. 10/239,794 filed Nov. 29, 2002 (now U.S. Pat. No. 6,892,341 B2).

FIELD OF THE INVENTION

The present invention relates to a hybrid ARQ retransmission method in a communication system according to the preamble part of claim 1.

BACKGROUND OF THE INVENTION

A common technique in communication systems, with unreliable and time-varying channel conditions is to correct errors based on automatic repeat request (ARQ) schemes together with a forward error correction (FEC) technique called hybrid ARQ (HARQ). If an error is detected by a commonly used cyclic redundancy check (CRC), the receiver of the communication system requests the transmitter to resend the erroneously received data packets.

S. Kallel, *Analysis of a type II hybrid ARQ scheme with code combining*, IEEE Transactions on Communications, Vol.38, No. 8, August 1990 and S. Kallel, R. Link, S. Bakhtiyari, *Throughput performance of Memory ARQ schemes*, IEEE Transactions on Vehicular Technology, Vol.48, No. 3, May 1999 define three different types of ARQ schemes:

Type I: The erroneous received packets are discarded and a new copy of the same packet is retransmitted and decoded separately. There is no combining of earlier and later received versions of that packet.

Type II: The erroneous received packets are not discarded, but are combined with some incremental redundancy bits provided by the transmitter for subsequent decoding. Retransmitted packets sometimes have higher coding rates and are combined at the receiver with the stored values. That means that only little redundancy is added in each retransmission.

Type III: Is the same as Type II with the constraint each retransmitted packet is now self-decodable. This implies that the transmitted packet is decodable without the combination with previous packets. This is useful if some packets are damaged in such a way that almost no information is reusable.

Types II and III schemes are obviously more intelligent and show a performance gain with respect to Type I, because they provide the ability to reuse information from of previously received erroneous packets. There exist basically three schemes of reusing the redundancy of previously transmitted packets:

Soft-Combining
Code-Combining
Combination of Soft- and Code-Combining

Soft-Combining

Employing soft-combining the retransmission packets carry identical symbols compared with the previously received symbols. In this case the multiple received packets are combined either by a symbol-by-symbol or by a bit-by-bit basis as for example disclosed in D. Chase, *Code combining: A maximum-likelihood decoding approach for combining an arbitrary number of noisy packets*, IEEE Trans. Commun., Vol. COM-33, pp. 385–393, May 1985 or B. A. Harvey and S. Wicker, *Packet Combining Systems based on the Viterbi Decoder*, IEEE Transactions on Communications, Vol. 42, No. 213/4, April 1994. By combining this soft-decision values from all received packets the reliabilities of the transmitted bits will increase linearly with the number and power of received packets. From a decoder point of view the same FEC scheme (with constant code rate) will be employed over all transmissions. Hence, the decoder does not need to know how many retransmissions have been performed, since it sees only the combined soft-decision values. In this scheme all transmitted packets will have to carry the same number of symbols.

Code-Combining

Code-combining concatenates the received packets in order to generate a new code word (decreasing code rate with increasing number of transmission). Hence, the decoder has to be aware of the FEC scheme to apply at each retransmission instant. Code-combining offers a higher flexibility with respect to soft-combining, since the length of the retransmitted packets can be altered to adapt to channel conditions. However, this requires more signaling data to be transmitted with respect to soft-combining.

Combination of Soft- and Code-Combining

In case the retransmitted packets carry some symbols identical to previously transmitted symbols and some code-symbols different from these, the identical code-symbols are combined using soft-combing as described in the section titled "Soft Combining" while the remaining code-symbols will be combined using code-combining. Here, the signaling requirements will be similar to code-combining.

As it has been shown in M. P. Schmitt, *Hybrid ARQ Scheme employing TCM and Packet Combining*, Electronics Letters Vol. 34, No. 18, September 1998 that HARQ performance for Trellis Coded Modulation (TCM) can be enhanced by rearranging the symbol constellation for the retransmissions. There, the performance gain results from the maximizing the Euclidean distances between the mapped symbols over the retransmissions, because the rearrangement has been performed on a symbol basis.

Considering high-order modulation schemes (with modulation symbols carrying more than two bits) the combining methods employing soft-combining have a major drawback: The bit reliabilities within soft-combined symbols will be in a constant ratio over all retransmissions, i.e. bits which have been less reliable from previous received transmissions will still be less reliable after having received further transmissions and, analogous, bits which have been more reliable from previous received transmissions will still be more reliable after having received further transmissions.

The varying bit reliabilities evolve from the constraint of two-dimensional signal constellation mapping, where modulation schemes-carrying more than 2 bits per symbol cannot have the same mean reliabilities for all bits under the assumption that all symbols are transmitted equally likely. The term mean reliabilities is consequently meant as the reliability of a particular bit over all symbols of a signal constellation.

Employing a signal constellation for a 16 QAM modulation scheme according to FIG. 1 showing a Gray encoded signal constellation with a given bit-mapping order $i_1q_1i_2q_2$, the bits mapped onto the symbols differ from each other in mean reliability in the first transmission of the packet. In more detail, bits $i_1$ and $q_1$ have a high mean reliability, as these bits are mapped to half spaces of the signal constellation diagram with the consequences that their reliability is independent from the fact of whether the bit transmits a one or a zero.

In contrast thereto, bits $i_2$ and $q_2$ have a low mean reliability, as their reliability depends on the fact of whether they transmit a one or a zero. For example, for bit $i_2$, ones are mapped to outer columns, whereas zeros are mapped to inner columns. Similarly, for bit $q_2$, ones are mapped to outer rows, whereas zeros are mapped to inner rows.

For the second and each further retransmissions the bit reliabilities will stay in a constant ratio to each other, which is defined by the signal constellation employed in the first transmission, i.e. bits $i_1$ and $q_1$ will always have a higher mean reliability than bits $i_2$ and $q_2$ after any number of retransmissions.

SUMMARY OF THE INVENTION

The object underlying the present invention is to provide a hybrid ARQ retransmission method with an improved error correction performance. This object is solved by a method as set forth in claim 1.

The method subject to the invention is based on the recognition that in order to enhance the decoder performance, it would be quite beneficial to have equal or near to equal mean bit reliabilities after each received transmission of a packet. Hence, the idea underlying the invention is to tailor the bit reliabilities over the retransmissions in a way that the mean bit reliabilities get averaged out. This is achieved by choosing a predetermined first and at least second signal constellation for the transmissions, such that the combined mean bit reliabilities for the respective bits of all transmissions are nearly equal.

Hence, the signal constellation rearrangement results in a changed bit mapping, wherein the Euclidean distances between the modulation symbols can be altered from retransmission to retransmission due to the movement of the constellation points. As a result, the mean bit reliabilities can be manipulated in a desired manner and averaged out to increase the performance the FEC decoder at the receiver.

BRIEF DESCRIPTION OF THE DRAWING

For a more in depth understanding of the present invention, preferred embodiments will be described in the following with reference to the accompanying drawings.

DETAILED DESCRIPTION OF EMBODIMENTS

For a better understanding of the embodiments, in the following the concept of a Log-Likelihood-Ratio (LLR) will be described as a metric for the bit reliabilities. First the straight forward calculation of the bit LLRs within the mapped symbols for a single transmission will be shown. Then the LLR calculation will be extended to the multiple transmission case.

Single Transmission

The mean LLR of the i-th bit $b_n^i$ under the constraint that symbol $s_n$ has been transmitted for a transmission over a channel with additive white gaussian noise (AWGN) and equally likely symbols yields $$LLR_{b_n^i|r_n}(r_n) = \log\left[\sum_{(m|b_m^i=b_n^i)} e^{-\frac{E_S}{N_0} \cdot d_{n,m}^2}\right] - \log\left[\sum_{(m|b_m^i \neq b_n^i)} e^{-\frac{E_S}{N_0} \cdot d_{n,m}^2}\right], \quad (1)$$

where $r_n = s_n$ denotes the mean received symbol under the constraint the symbol $S_n$ has been transmitted (AWGN case), $d_{n,m}^2$ denotes the square of the Euclidean distance between the received symbol $r_n$ and the symbol $s_m$, and $E_S/N_0$ denotes the observed signal-to-noise ratio.

It can be seen from Equation (1) that the LLR depends on the signal-to-noise ratio $E_S/N_0$ and the Euclidean distances $d_{n,m}$ between the signal constellation points.

Multiple Transmissions

Considering multiple transmissions the mean LLR after the k-th transmission of the i-th bit $b_n^i$ under the constraint that symbols $s_n^{(j)}$ have been transmitted over independent AWGN channels and equally likely symbols yields $$LLR_{b_n^i|\bigcap_{j=1}^k r_n^{(j)}}(r_n^{(1)}, r_n^{(2)}, \ldots, r_n^{(k)}) = \log\left[\sum_{(m|b_m^i=b_n^i)} e^{-\sum_{j=1}^k \left(\frac{E_S}{N_0}\right)^{(j)} \cdot \left(d_{n,m}^{(j)}\right)^2}\right] - \log\left[\sum_{(m|b_m^i \neq b_n^i)} e^{-\sum_{j=1}^k \left(\frac{E_S}{N_0}\right)^{(j)} \cdot \left(d_{n,m}^{(j)}\right)^2}\right], \quad (2)$$

where j denotes the j-th transmission ((j−1)-th retransmission). Analogous to the single transmission case the mean LLRs depend on the signal-to-noise ratios and the Euclidean distances at each transmission time.

If no constellation rearrangement is performed the Euclidean distances $d_{n,m}^{(j)} = d_{n,m}^{(1)}$ are constant for all transmissions and, hence, the bit reliabilities (LLRs) after k transmissions will be defined by the observed signal-to-noise ratio at each transmission time and the signal constellation points from the first transmission. For higher level modulation schemes (more than 2 bits per symbol) this results in varying mean LLRs for the bits, which in turn leads to different mean bit reliabilities. The differences in mean reliabilities remain over all retransmissions and lead to a degradation in decoder performance.

16-QAM Strategy

Figure 1:
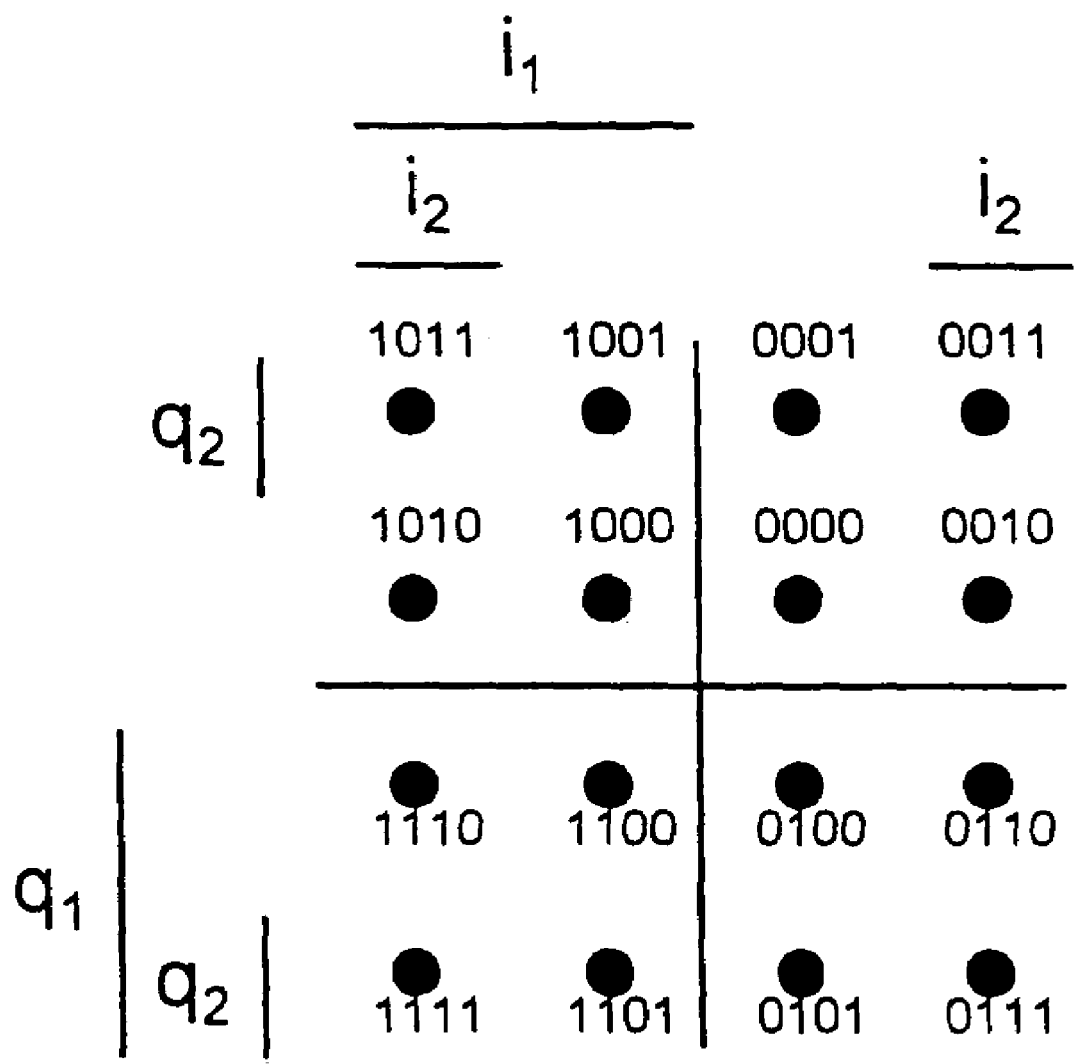
FIG. 1 is an exemplary signal constellation for illustrating a 16 QAM modulation scheme with Gray encoded bit symbols.

In the following, the case of a 16-QAM system will be exemplarily considered resulting in 2 high reliable and 2 low reliable bits, where for the low reliable bits the reliability depends on transmitting a one or a zero (see FIG. 1). Hence, overall there exist 3 levels of reliabilities.

Level 1 (High Reliability, 2 bits): Bit mapping for ones (zeros) separated into the positive (negative) real half space for the i-bits and the imaginary half space the q-bits. Here, there is no difference whether the ones are mapped to the positive or to the negative half space.

Level 2 (Low Reliability, 2 bits): Ones (zeros) are mapped to inner (outer) columns for the i-bits or to inner (outer) rows for the q-bits. Since there is a difference for the LLR depending on the mapping to the inner (outer) columns and rows, Level 2 is further classified:

Level 2a: Mapping of $i_n$ to inner columns and $q_n$ to inner rows respectively.

Level 2b: Inverted mapping of Level 2a: Mapping of $i_n$ to outer columns and $q_n$ to outer rows respectively.

To ensure an optimal averaging process over the transmissions for all bits the levels of reliabilities have to be altered by changing the signal constellations according to the algorithms given in the following section.

It has to be considered that the bit-mapping order is open prior initial transmission, but has to remain through retransmissions, e.g. bit-mapping for initial transmission: $i_1q_1i_2q_2$ ⊏ bit-mapping all retransmissions: $i_1q_1i_2q_2$.

Figure 2:
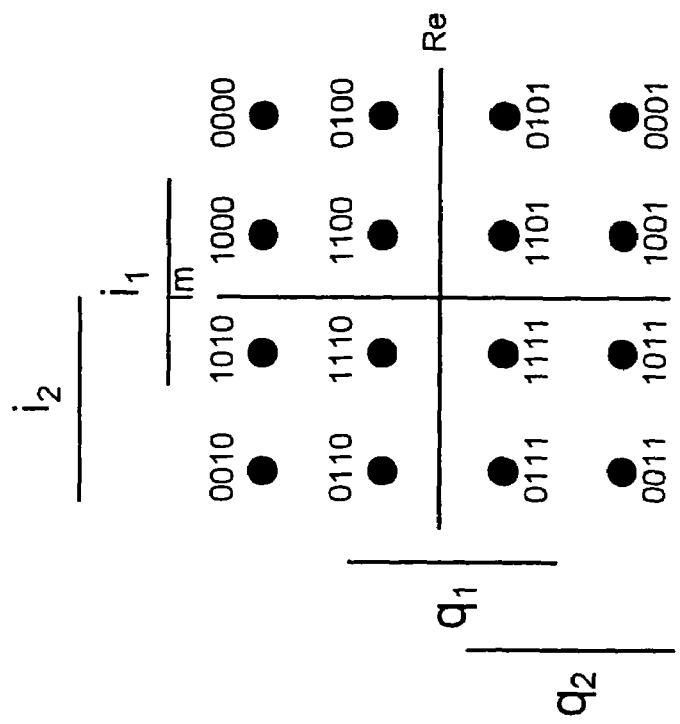
FIG. 2 shows four examples for signal constellations for a 16 QAM modulation scheme with Gray encoded bit symbols.
Figure 2:
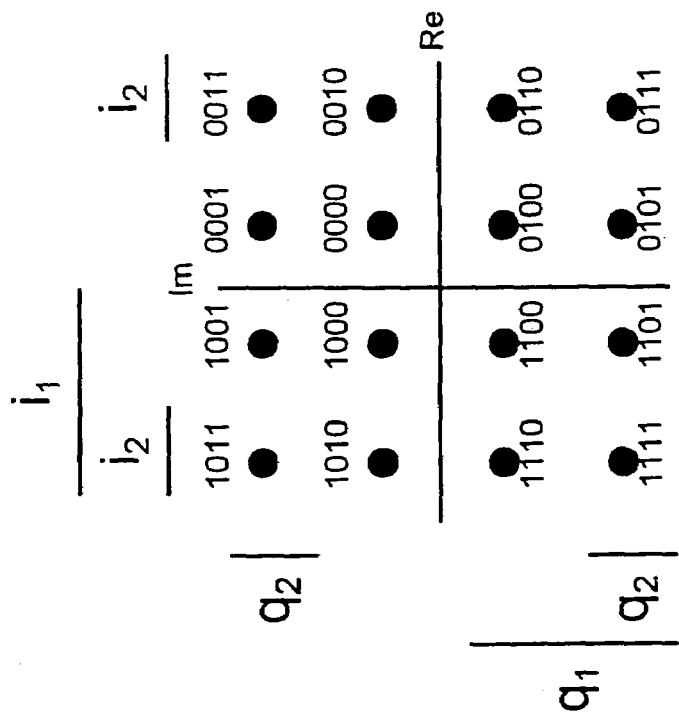
Figure 2:
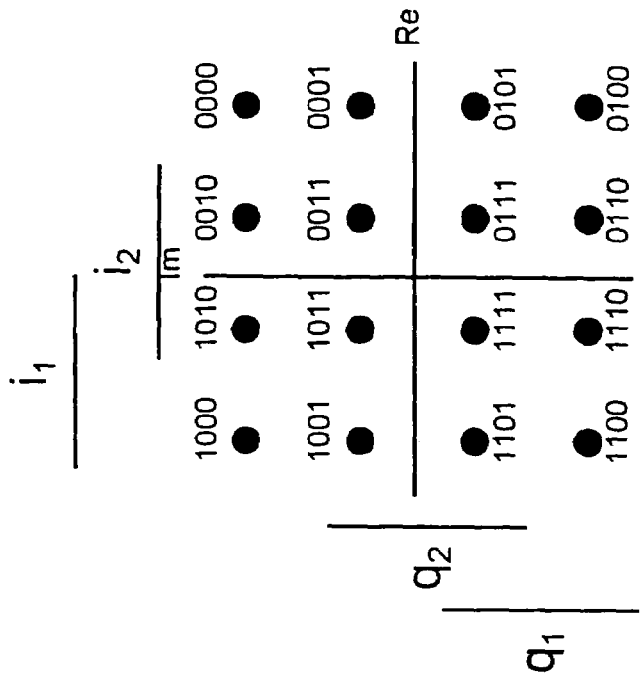
Figure 2:
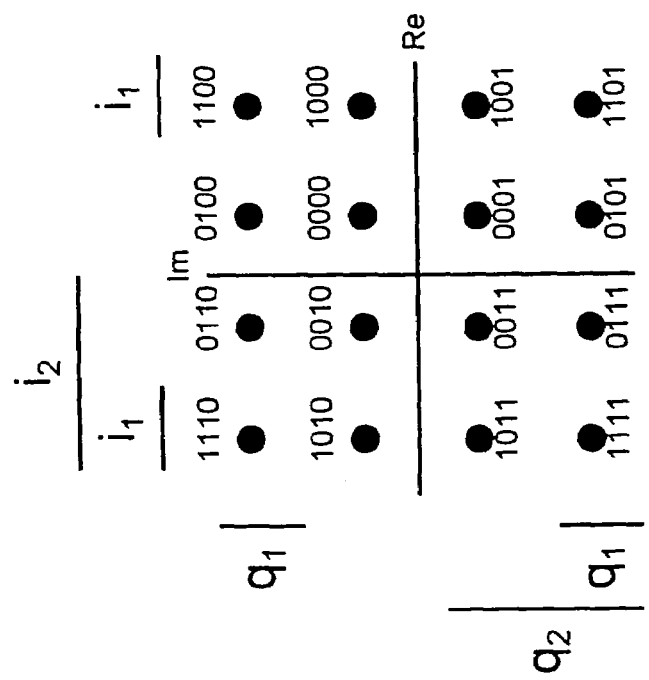

For the actual system implementation there are a number of possible signal constellations to achieve the averaging process over the retransmissions. Some examples for possible constellations are shown in FIG. 2. The resulting bit reliabilities according to FIG. 2 are given in Table 1.

TABLE 1

Bit reliabilities for 16-QAM according to signal constellations shown in FIG. 2

| Constellation | bit $i_1$ | bit $q_1$ | bit $i_2$ | bit $q_2$ |
|---|---|---|---|---|
| 1 | High Reliability (Level 1) | High Reliability (Level 1) | Low Reliability (Level 2b) | Low Reliability (Level 2b) |
| 2 | Low Reliability (Level 2a) | Low Reliability (Level 2a) | High Reliability (Level 1) | High Reliability (Level 1) |
| 3 | Low Reliability (Level 2b) | Low Reliability (Level 2b) | High Reliability (Level 1) | High Reliability (Level 1) |
| 4 | High Reliability (Level 1) | High Reliability (Level 1) | Low Reliability (Level 2a) | Low Reliability (Level 2a) |

Moreover, Table 2 provides some examples how to combine the constellations for the transmissions 1 to 4 (using 4 different mappings).

TABLE 2

Examples for Constellation Rearrangement strategies for 16-QAM (using 4 mappings) with signal constellations according to FIG. 2 and bit reliabilities according to Table 1.

| Transmission No. | Scheme 1 (with Constellations) | Scheme 2 (with Constellations) | Scheme 3 (with Constellations) | Scheme 4 (with Constellations) |
|---|---|---|---|---|
| 1 | 1 | 1 | 1 | 1 |
| 2 | 2 | 2 | 3 | 3 |
| 3 | 3 | 4 | 2 | 4 |
| 4 | 4 | 3 | 4 | 2 |

Two algorithms are given which describe schemes using 2 or 4 mappings overall. The approach using 2 mappings results in less system complexity, however has some performance degradation with respect to the approach using 4 mappings. The mapping for i- and q-bits can be done independently and, hence, in the following the mapping for the i-bits only is described. The algorithms for the q-bits work analog.

16-QAM Algorithms

A. Using 2 Mappings
  1. Step (1. Transmission)
Choose Level 1 for $i_1$ ⇒ Level 2 for $i_2$—free choice if 2a or 2b
⇒1. Mapping defined
  2. Step (2. Transmission)
Choose Level 1 for $i_2$ ⇒ Level 2 for $i_1$—free choice if 2a or 2b
⇒2. Mapping defined
  3. Step
Options:
(a) Go to 1. Step and proceed with alternating between 1. and 2. Mapping
(b) Use 2. Mapping and proceed with using 2 times 1. Mapping, 2 times 2. Mapping and so on . . .

B. Using 4 Mappings
  1. Step. (1. Transmission)
Choose Level 1 for $i_1$ ⇒ Level 2 for $i_2$—free choice if 2a or 2b
⇒1. Mapping defined
  2. Step (2. Transmission)
Choose Level 1 for $i_2$ ⇒ Level 2 for $i_1$—free choice if 2a or 2b
⇒2. Mapping defined
  3. Step (3. Transmission)
Options:
  (a) Choose Level 1 for $i_1$ ⇒ Level 2 for $i_2$ with following options
    (a1) if in 1. Transmission 2a was used then use 2b
    (a2) if in 1. Transmission 2b was used then use 2a
  (b) Choose Level 1 for $i_2$ ⇒ Level 2 for $i_1$ with following options
    (b1) if in 2. Transmission 2a was used then use 2b
    (b2) if in 2. Transmission 2b was used then use 2a
⇒3. Mapping defined
  4. Step (4. Transmission)
if option (a) in 3. Step
    Choose Level 1 for $i_2$ ⇒ Level 2 for $i_1$ with following options
    (a1) if in 2. Transmission 2a was used then use 2b
    (a2) if in 2. Transmission 2b was used then use 2a
if option (b) in 3. Step
    Choose Level 1 for $i_1$ ⇒ Level 2 for $i_2$ with following options
    (a1) if in 1. Transmission 2a was used then use 2b
    (a2) if in 1. Transmission 2b was used then use 2a
⇒4. Mapping defined
  5. Step (5., 9., 13., . . . Transmission)
Choose one out of 4 defined mappings
  6. Step (6., 10., 14., . . . Transmission)
Choose one out of 4 defined mappings except
  (a) the mapping used in 5. Step (previous transmission)
  (b) the mapping giving Level 1 reliability to the same bit as in previous transmission
  7. Step (7., 11., 15., . . . Transmission)
Choose one out of 2 remaining mappings not used in last 2 transmissions
  8. Step (8., 12., 16., . . . Transmission)
Choose mapping not used in last 3 transmissions
  9. Step
Go to 5. Step

64-QAM Strategy

Figure 3:
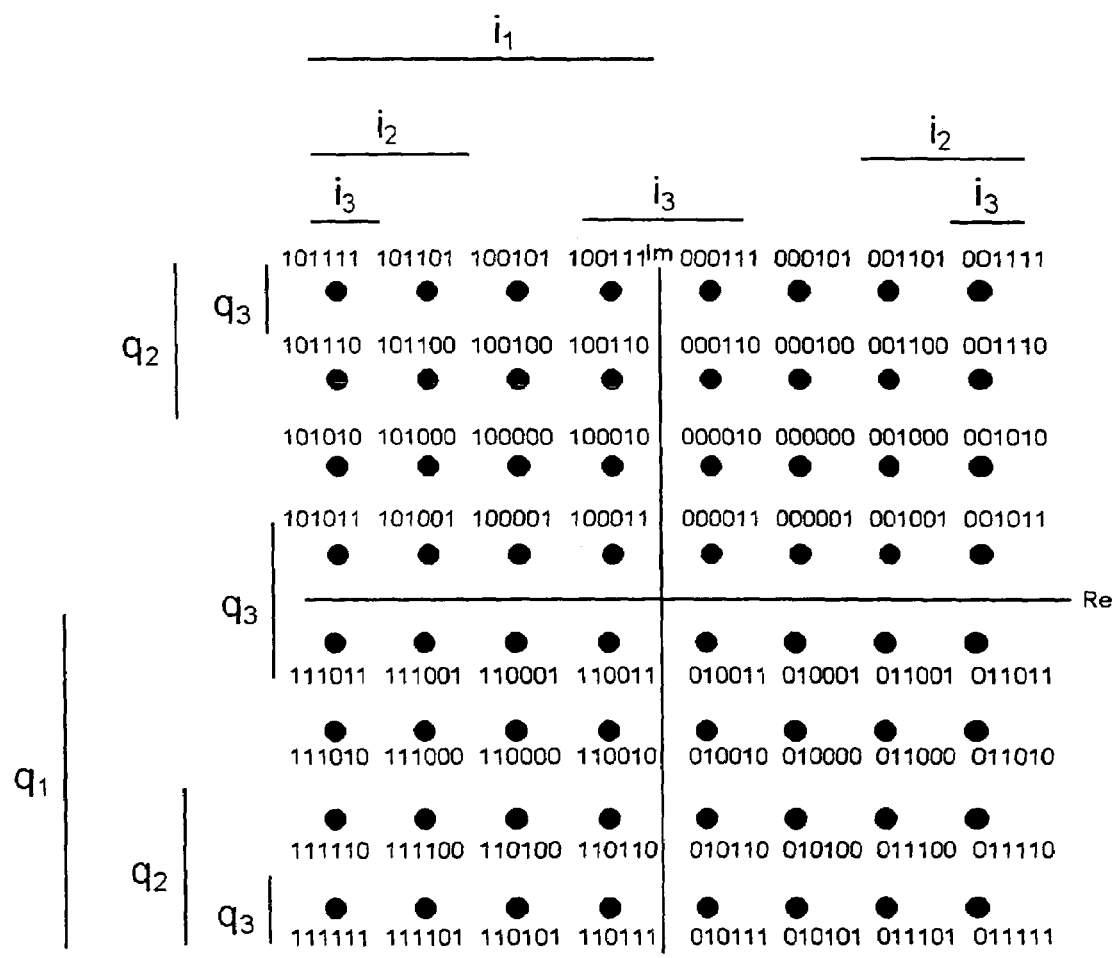
FIG. 3 shows an exemplary signal constellation for 64-QAM Gray encoded bit symbols.

In case of a 64-QAM system there will be 2 high reliable, 2 medium reliable and 2 low reliable bits, where for the low and medium reliable bits the reliability depends on transmitting a one or a zero (see FIG. 3). Hence, overall there exist 5 levels of reliabilities.

Level 1 (High Reliability, 2 bits): Bit mapping for ones (zeros) separated into the positive (negative) real half space for the i-bits and the imaginary half space for the q-bits. Here, there is no difference whether the ones are mapped to the positive or to the negative half space.

Level 2 (Medium Reliability, 2 bits): Ones (zeros) are mapped to 4 inner and 2×2 outer columns for the i-bits or to 4 inner and 2×2 outer rows for the q-bits. Since there is a difference for the LLR depending on the mapping to the inner or outer column/row Level 2 is further classified:

Level 2a: Mapping of $i_n$ to 4 inner columns and $q_n$ to 4 inner rows respectively.

Level 2b: Inverted mapping of 2a: $i_n$ to outer columns and $q_n$ to outer rows respectively.

Level 3 (Low Reliability, 2 bits): Ones (zeros) are mapped to columns 1-4-5-8/2-3-6-7 for the i-bits or to rows 1-4-5-8/2-3-6-7 for the q-bits. Since there is a difference for the LLR depending on the mapping to columns/rows 1-4-5-8 or 2-3-6-7 Level 3 is further classified:

Level 3a: Mapping of $i_n$ to columns 2-3-6-7 and $q_n$ to rows 2-3-6-7 respectively Level 3b: Inverted mapping of 2a: $i_n$ to columns 1-4-5-8 and $q_n$ to rows 1-4-

To ensure an optimal averaging process over the transmissions for all bits the levels of reliabilities have to be altered by changing the signal constellations according to the algorithms given in the following section.

It has to be considered that the bit-mapping order is open prior initial transmission, but has to remain through retransmissions, e.g. bit-mapping for initial transmission: $i_1q_1i_2q_2i_3q_3 \in$ bit-mapping all retransmissions: $i_1q_1i_2q_2i_3q_3$.

Figure 4:
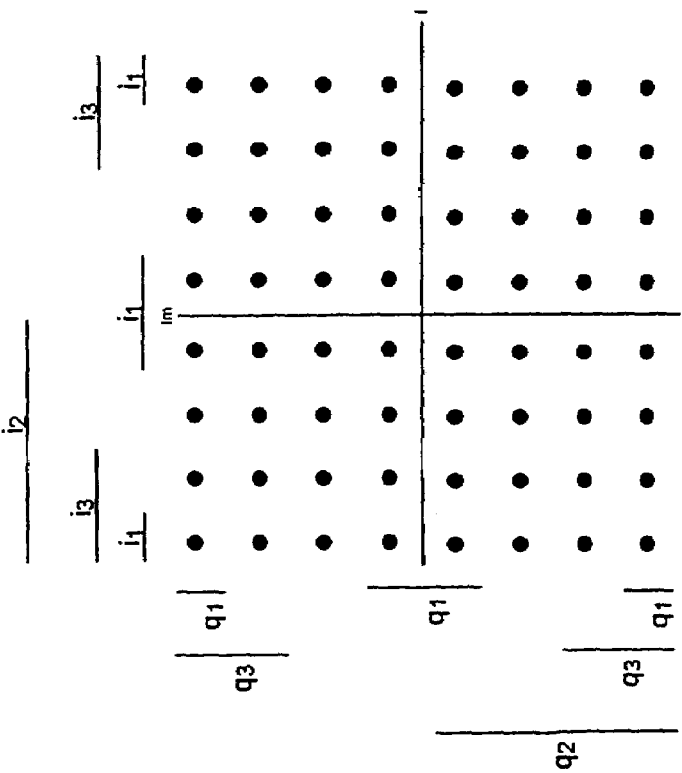
FIG. 4 shows six exemplary signal constellations for 64-QAM Gray encoded bit symbols
Figure 4:
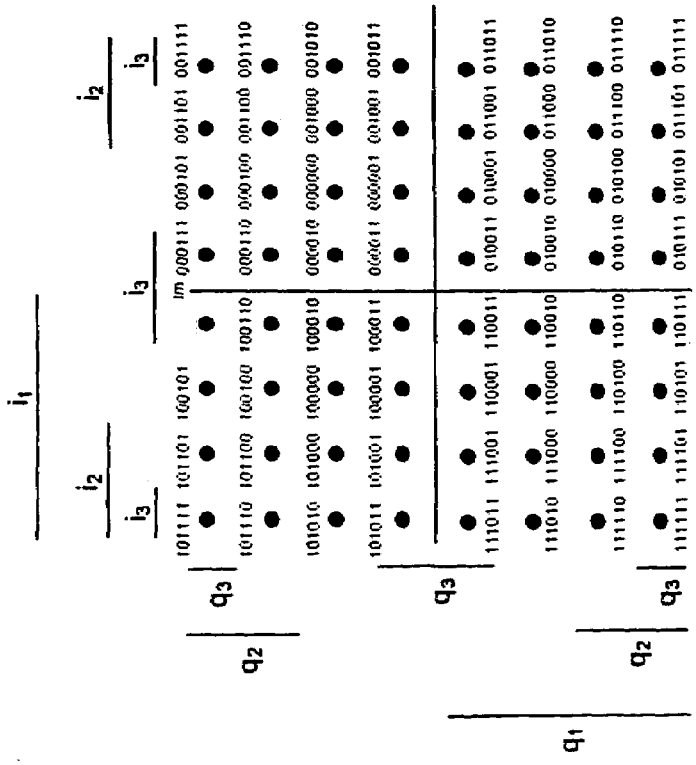
Figure 4:
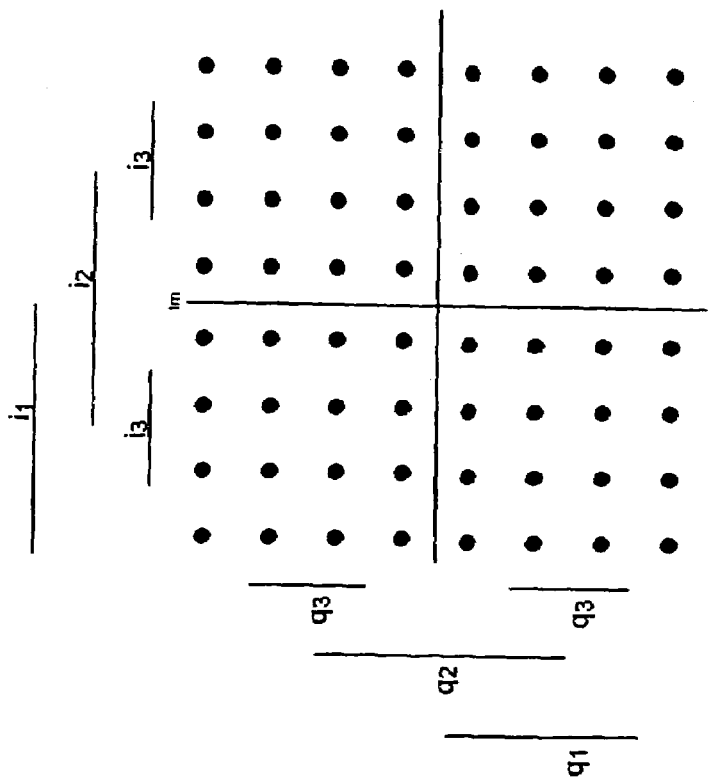
Figure 4:
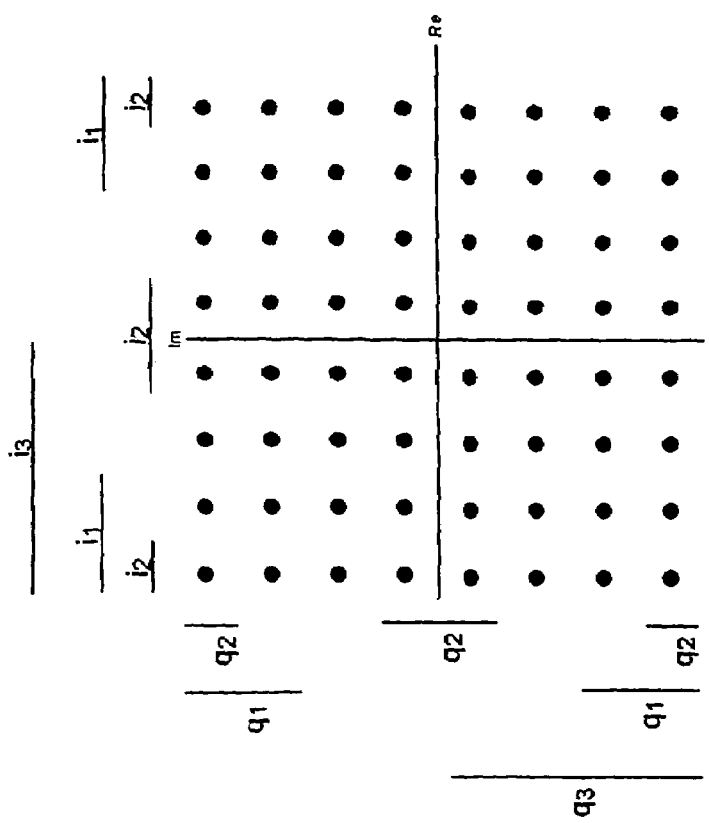
Figure 4:
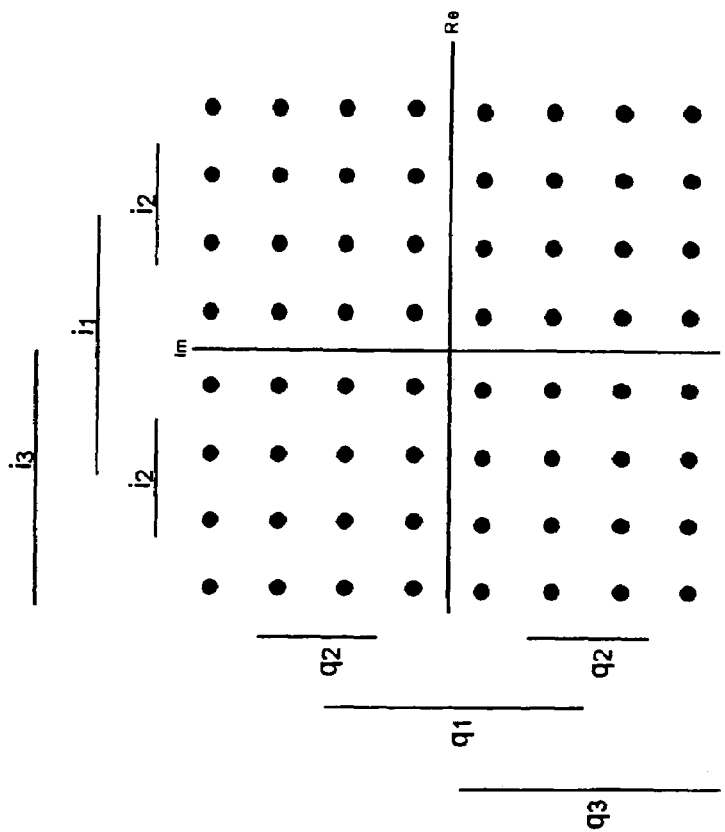
Figure 4:
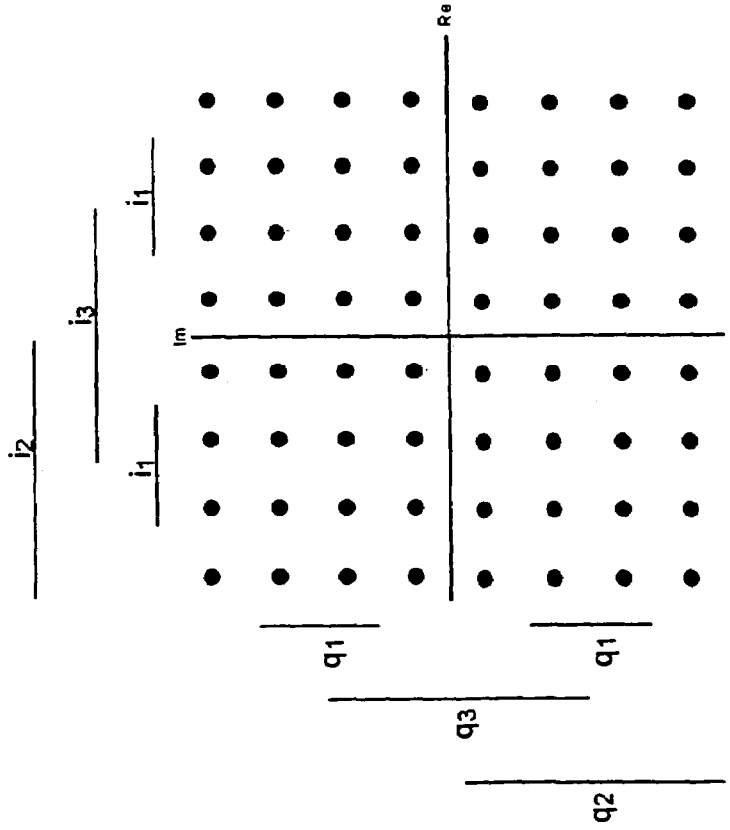

Analog to 16-QAM for the actual system implementation there are a number of possible signal constellations to achieve the averaging process over the retransmissions. Some examples for possible constellations are shown in FIG. 4. The resulting bit reliabilities according to FIG. 4 are given in Table 3.

Moreover, Table 4 provides some examples how to combine the constellations for the transmissions 1 to 6 (using 6 different mappings).

TABLE 4

Examples for Constellation Rearrangement strategies for 64-QAM (using 6 mappings) with signal constellations according to FIG. 4 and bit reliabilities according to Table 3.

| Transmission No. | Scheme 1 (with Constellations) | Scheme 2 (with Constellations) | Scheme 3 (with Constellations) | Scheme 4 (with Constellations) |
|---|---|---|---|---|
| 1 | 1 | 1 | 1 | 1 |
| 2 | 2 | 3 | 5 | 3 |
| 3 | 3 | 2 | 6 | 2 |
| 4 | 4 | 4 | 4 | 6 |
| 5 | 5 | 5 | 2 | 5 |
| 6 | 6 | 6 | 3 | 4 |

Two algorithms are given which describe schemes using 3 or 6 mappings overall. The approach using 3 mappings results in less system complexity, however has some performance degradation with respect to the approach using 6 mappings. The mapping for i- and q-bits can be done independently and, hence, in the following the mapping for the i-bits only is described. The algorithms for the q-bits work analog.

64-QAM Algorithms

A. Using 3 Mappings

1. Step (1. Transmission)
    1. Step (1. Transmission)
    Choose Level 1 for $i_1$
    Choose Level 2 for $i_2$ (free choice if 2a or 2b)⇒Level 3 for $i_3$—free choice if 3a or 3b
    ⇒1. Mapping defined
2. Step (2. Transmission)

Options:

(a) Choose Level 1 for $i_2$
Choose Level 2 for $i_3$ (free choice if 2a or 2b)⇒Level 3 for $i_1$—free choice if 3a or 3b (b) Choose Level 1 for $i_3$
Choose Level 2 for $i_1$ (free choice if 2a or 2b)⇒Level 3 for $i_2$—free choice if 3a or 3b ⇒2. Mapping defined 3. Step (3. Transmission)
if (a) in 2. Step

TABLE 3

Bit reliabilities for 64-QAM according to signal constellations shown in FIG. 4.

| Constellation | bit $i_1$ | bit $q_1$ | bit $i_2$ | bit $q_2$ | bit $i_3$ | bit $q_3$ |
|---|---|---|---|---|---|---|
| 1 | High Reliability (Level 1) | High Reliability (Level 1) | Middle Reliability (Level 2b) | Middle Reliability (Level 2b) | Low Reliability (Level 3b) | Low Reliability (Level 3b) |
| 2 | Low Reliability (Level 3b) | Low Reliability (Level 3b) | High Reliability (Level 1) | High Reliability (Level 1) | Middle Reliability (Level 2b) | Middle Reliability (Level 2b) |
| 3 | Middle Reliability (Level 2b) | Middle Reliability (Level 2b) | Low Reliability (Level 3b) | Low Reliability (Level 3b) | High Reliability (Level 1) | High Reliability (Level 1) |
| 4 | High Reliability (Level 1) | High Reliability (Level 1) | Middle Reliability (Level 2a) | Middle Reliability (Level 2a) | Low Reliability (Level 3a) | Low Reliability (Level 3a) |
| 5 | Low Reliability (Level 3a) | Low Reliability (Level 3a) | High Reliability (Level 1) | High Reliability (Level 1) | Middle Reliability (Level 2a) | Middle Reliability (Level 2a) |
| 6 | Middle Reliability (Level 2a) | Middle Reliability (Level 2a) | Low Reliability (Level 3a) | Low Reliability (Level 3a) | High Reliability (Level 1) | High Reliability (Level 1) |

Figure 5:
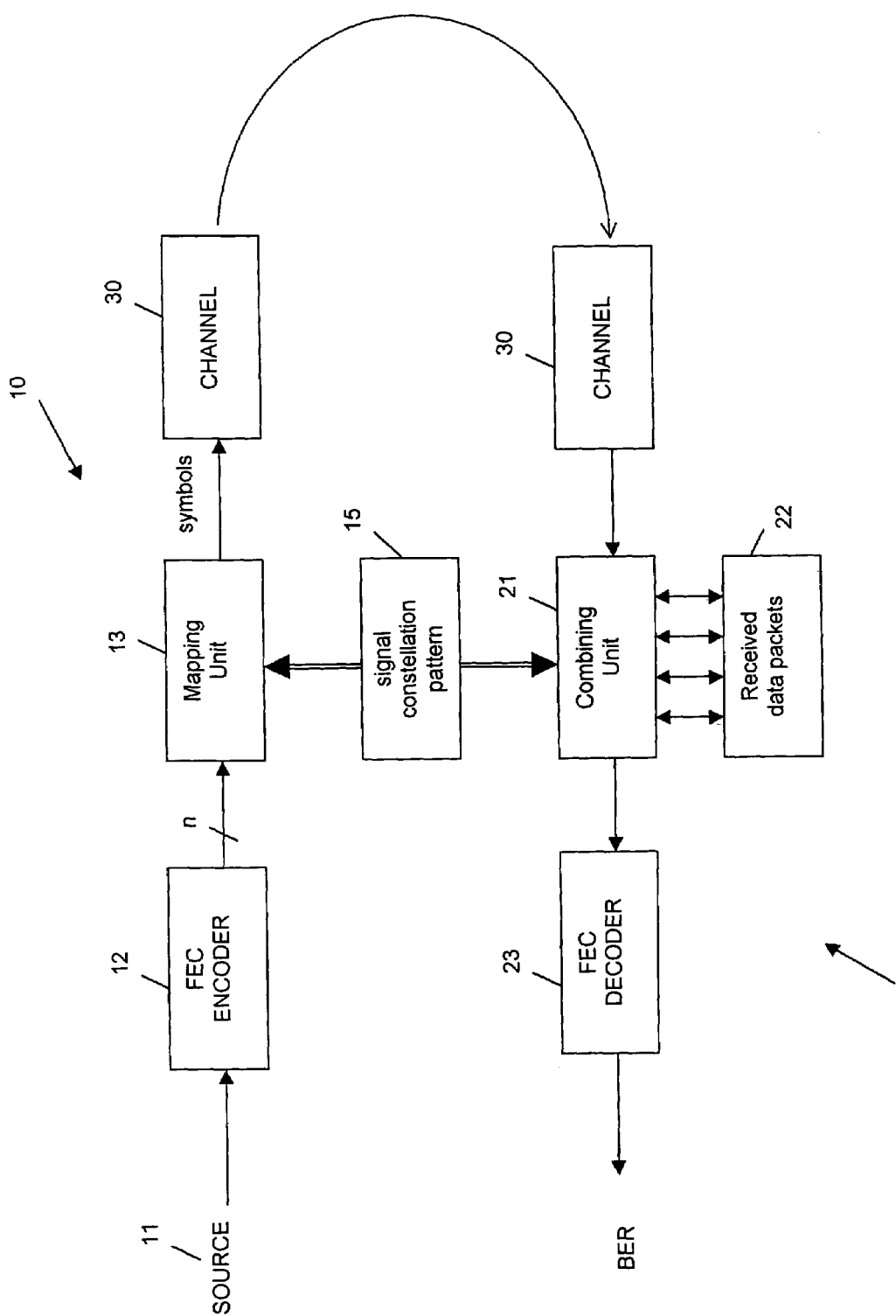
FIG. 5 is an exemplary embodiment of a communication system in which the method underlying the invention is employed, and FIG. 6 explains details of the mapping unit shown in FIG. 5.

Choose Level 1 for $i_3$
Choose Level 2 for $i_1$ (free choice if 2a or 2b)⇒Level 3 for $i_2$—free choice if 3a or 3b if (b) in 2. Step
Choose Level 1 for $i_2$
Choose Level 2 for $i_3$ (free choice if 2a or 2b)⇒Level 3 for $i_1$—free choice if 3a or 3b
⇒3. Mapping defined
    4. Step (4., 7., 10, . . . Transmission)
Choose one out of 3 defined mappings
    5. Step (5., 8., 11, . . . Transmission)
Choose one out of 3 defined mappings except the mapping used in previous transmission
    6. Step (6., 9., 12, . . . Transmission)
Choose one out of 3 defined mappings except the mapping used in last 2 transmissions
    7. Step
Go to 4. Step B. Using 6 Mappings
    1. Step (1. Transmission)
Choose Level 1 for $i_1$
Choose Level 2 for $i_2$ (free choice if 2a or 2b)⇒Level 3 for $i_3$—free choice if 3a or 3b
⇒1. Mapping defined
    2. Step (2. Transmission)
Options:
(a) Choose Level 1 for $i_2$
Choose Level 2 for $i_3$ (free choice if 2a or 2b)⇒Level 3 for $i_1$—free choice if 3a or 3b
(b) Choose Level 1 for $i_3$
Choose Level 2 for $i_1$ (free choice if 2a or 2b)⇒Level 3 for $i_2$—free choice if 3a or 3b
⇒2. Mapping defined
    3. Step (3. Transmission)
if (a) in 2. Step
Choose Level 1 for $i_3$
Choose Level 2 for $i_1$ (free choice if 2a or 2b)⇒Level 3 for $i_2$—free choice if 3a or 3b
if (b) in 2. Step
Choose Level 1 for $i_2$
Choose Level 2 for $i_3$ (free choice if 2a or 2b)⇒Level 3 for $i_1$—free choice if 3a or 3b
⇒3. Mapping defined
    4. Step (4. Transmission)
Choose Level 1 for one bit out of $i_1$, $i_2$ or $i_3$
Choose Level 2 for one out of two remaining bits with following restrictions
    (a1) if in one of the previous transmission 2a was used for this bit then use 2b
    (a2) if in one of the previous transmission 2b was used for this bit then use 2a
⇒Level 3 for remaining bit with following restrictions
    (b1) if in one of the previous transmission 3a was used for this bit then use 3b
    (b2) if in one of the previous transmission 3b was used for this bit then use 3a
⇒4. Mapping defined
    5. Step (5. Transmission)
Choose Level 1 for one out of two bits not having Level 1 in 4. Step
Choose Level 2 for one out of two bits not having Level 2 in 4. Step with following restrictions
    (a1) if in one of the previous transmission 2a was used for this bit then use 2b
    (a2) if in one of the previous transmission 2b was used for this bit then use 2a
⇒Level 3 for remaining bit with following restrictions
    (b1) if in one of the previous transmission 3a was used for this bit then use 3b
    (b2) if in one of the previous transmission 3b was used for this bit then use 3a
⇒5. Mapping defined
    6. Step (6. Transmission)
Choose Level 1 for bit not having Level 1 in 4. Step and 5. Step
Choose Level 2 for bit not having Level 2 in 4. Step and 5. Step with following restrictions
    (a1) if in one of the previous transmission 2a was used for this bit then use 2b
    (a2) if in one of the previous transmission 2b was used for this bit then use 2a
⇒Level 3 for remaining bit with following restrictions
    (b1) if in one of the previous transmission 3a was used for this bit then use 3b
    (b2) if in one of the previous transmission 3b was used for this bit then use 3a
⇒6. Mapping defined
    7. Step (7., 13., 19., . . . Transmission)
Choose one out of 6 defined mappings
    8. Step (8., 14., 20., . . . Transmission)
Choose one out of 6 defined mappings except
    (a) the mapping used in 7. Step (previous transmission)
    (b) the mapping giving Level 1 reliability to the same bit as in previous transmission
    9. Step (9., 15., 21., . . . Transmission)
Choose one out of 6 defined mappings with giving Level 1 reliability to the bit not having Level 1 in last 2 transmissions
    10. Step (10., 16., 22., . . . Transmission)
Choose one out of 3 remaining mappings not used in last 3 transmissions
    11. Step (11., 17., 23., . . . Transmission)
Choose one out of 2 remaining mappings not used in last 4 transmissions
    12. Step (12., 18., 24., . . . Transmission)
Choose remaining mapping not used in last 5 transmissions
    13. Step
Go to 7. Step FIG. 5 shows an exemplary embodiment of a communication system to which the present invention can be applied. More specifically, the communication system comprises a transmitter 10 and a receiver 20 which communicate through a channel 30 which can either be wire-bound or wireless, i.e. an air interface. From a data source 11, data packets are supplied to a FEC encoder 12, where redundancy bits are added to correct errors. The n bits output from the FEC decoder are subsequently supplied to a mapping unit 13 acting as a modulator to output symbols formed according to the applied modulation scheme stored as a constellation pattern in a table 15. Upon transmission over the channel 30, the receiver 20 checks the received data packets, for example, by means of a cyclic redundancy check (CRC) for correctness. If the received data packets are erroneous, the same are stored in a temporary buffer 22 for subsequent soft combining with the retransmitted data packets.

A retransmission is launched by an automatic repeat request issued by an error detector (not shown) with the result that an identical data packet is transmitted from the transmitter 10. In the combining unit 21, the previously received erroneous data packets are soft-combined with the retransmitted data packets. The combining unit 21 also acts as a demodulator and the same signal constellation pattern stored in the table 15 is used to demodulate the symbol which was used during the modulation of that symbol.

Figure 6:
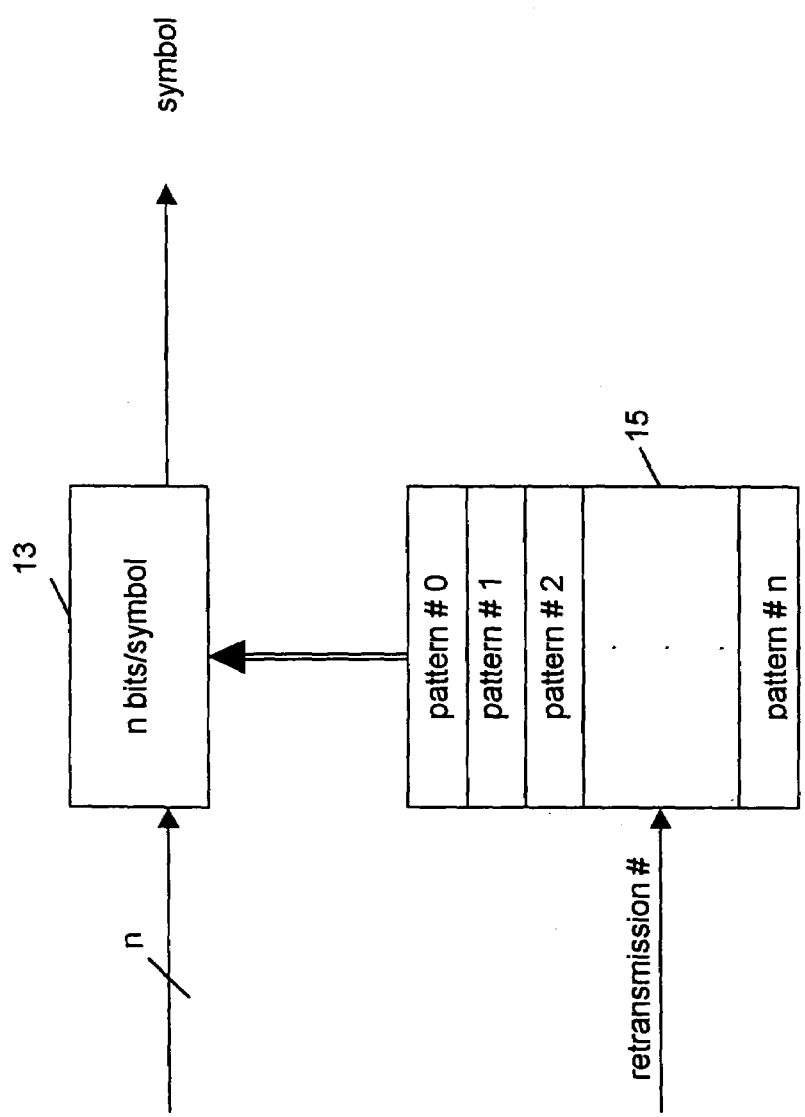

As illustrated in FIG. 6, the table 15 stores a plurality of signal constellation patterns which are selected for the individual (re)-transmissions according to a predetermined scheme. The scheme, i.e. the sequence of signal constellation patterns used for modulating/demodulating are either pre-stored in the transmitter and the receiver or are signaled by transmitter to the receiver prior to usage.

As mentioned before, the method underlying the invention rearranges the signal constellation patterns for the individual (re)-transmissions according to a predetermined scheme, such that the mean bit reliabilities are averaged out. Hence, the performance of the FEC decoder 23 is significantly improved, resulting in a low bit error rate (BER) output from the decoder.

The invention claimed is:

1. A data reception apparatus comprising:

a reception section that (i) receives data modulated and transmitted using a first constellation pattern, and (ii) receives all or a part of said data modulated and retransmitted using a second constellation pattern, and a demodulating section that demodulates said data, received in operation (i), using said first constellation pattern and demodulates said all or a part of said data, received in operation (ii), using said second constellation pattern, wherein:

each of said first and second constellation patterns is a constellation for a 16 QAM modulation scheme, and said second constellation pattern is different from the first constellation pattern, with respect to a sequence of bits $(i_1 q_1 i_2 q_2)$ in a symbol, by at least one of (a) exchanging the positions of the first bit $i_1$ and third bit $i_2$ as well as that of the second bit $q_1$ and fourth bit $q_2$ relative to one another and (b) inverting the third bit $i_2$ and fourth bit $q_2$ respectively.

2. A data reception apparatus according to claim 1, further comprising a constellation table that stores a plurality of constellation patterns including said first constellation pattern and said second constellation pattern to be used in said demodulating section.

3. A data reception apparatus according to claim 1, further comprising a storage that stores a sequence of constellation patterns including said first constellation pattern and said second constellation pattern to be used in said demodulating section.

4. A data reception apparatus according to claim 1, wherein said second constellation pattern is different from said first constellation pattern with respect to a reliability of a bit mapped onto a symbol in each of the first and second constellation patterns.

5. A base station apparatus equipped with the data reception apparatus according to claim 1.

6. A communication terminal apparatus equipped with the data reception apparatus according to claim 1.

7. A data reception apparatus comprising:

a reception section that (i) in a first reception, receives data modulated and transmitted using a first constellation pattern, and (ii) in a second reception, receives all or a part of said data modulated and retransmitted using a second constellation pattern, and a demodulating section that in said first reception, demodulates said data, received in said first reception, using said first constellation pattern and -in said second reception, demodulates said all or a part of said data, received in said second reception, using said second constellation pattern, wherein:

each of said first and second constellation patterns is a constellation for a 16 QAM modulation scheme, and one of said first constellation pattern and said second constellation pattern is produced, with respect to a sequence of bits $(i_1 q_1 i_2 q_2)$ in a symbol, by at least one of (a) exchanging the positions of the first bit $i_1$ and third bit $i_2$ as well as that of the second bit $q_1$ and fourth bit $q_2$ relative to one another and (b) inverting the third bit $i_2$ and fourth bit $q_2$ respectively.

8. A data reception apparatus according to claim 7, further comprising a constellation table that stores a plurality of constellation patterns including said first constellation pattern and said second constellation pattern to be used in said demodulating section.

9. A data reception apparatus according to claim 7, further comprising a storage that stores a sequence of constellation patterns including said first constellation pattern and said second constellation pattern to be used in said demodulating section.

10. A data reception apparatus according to claim 7, wherein said second constellation pattern is different from said first constellation pattern with respect to a reliability of a bit mapped onto a symbol in each of the first and second constellation patterns.

* * * * *